Dec. 20, 1932.  E. DANNER  1,891,370
METHOD AND APPARATUS FOR MANUFACTURING GLASSWARE
Filed May 23, 1922  10 Sheets-Sheet 1
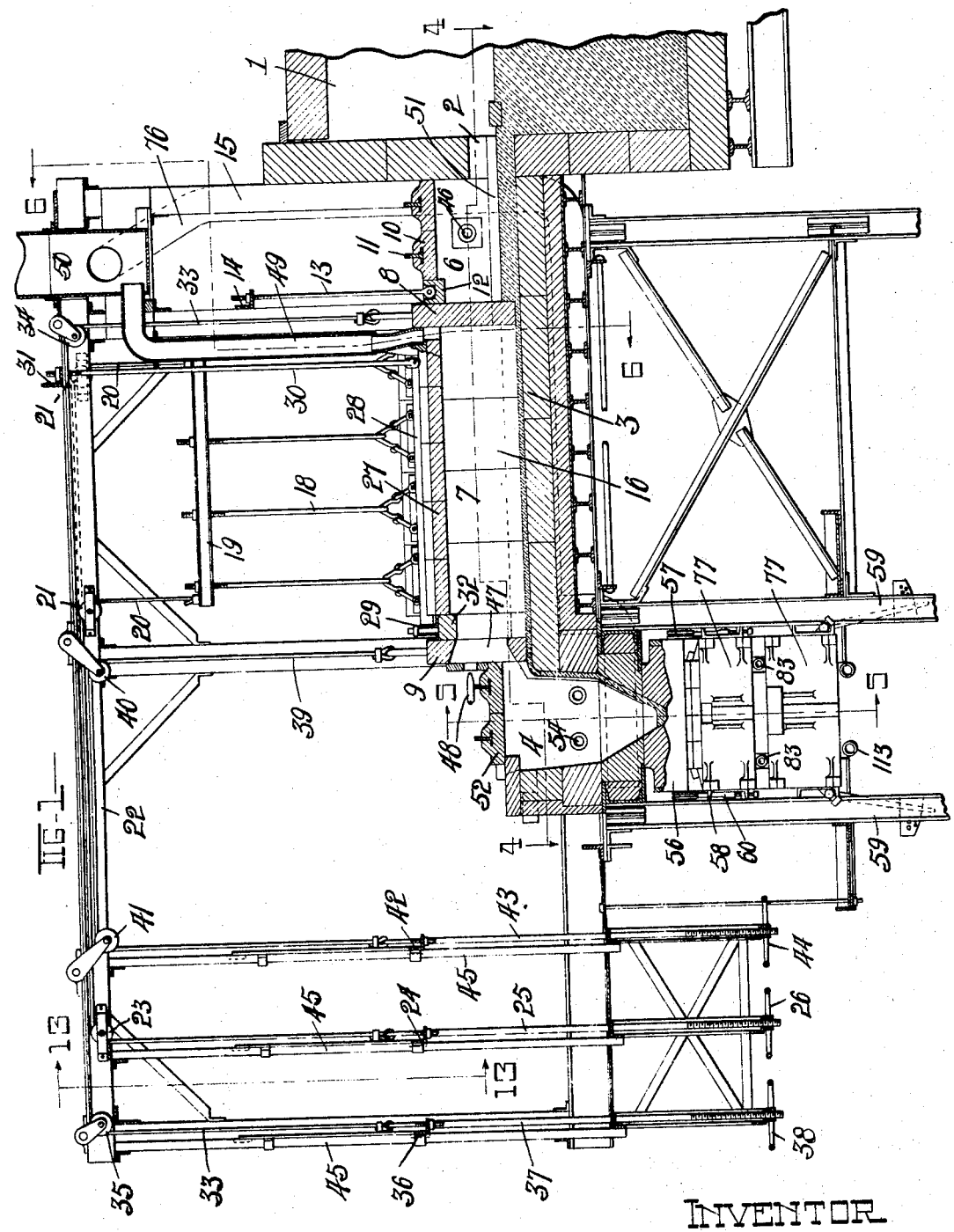
INVENTOR
Edward Danner
By Owen Owen + Crampton
Attys.

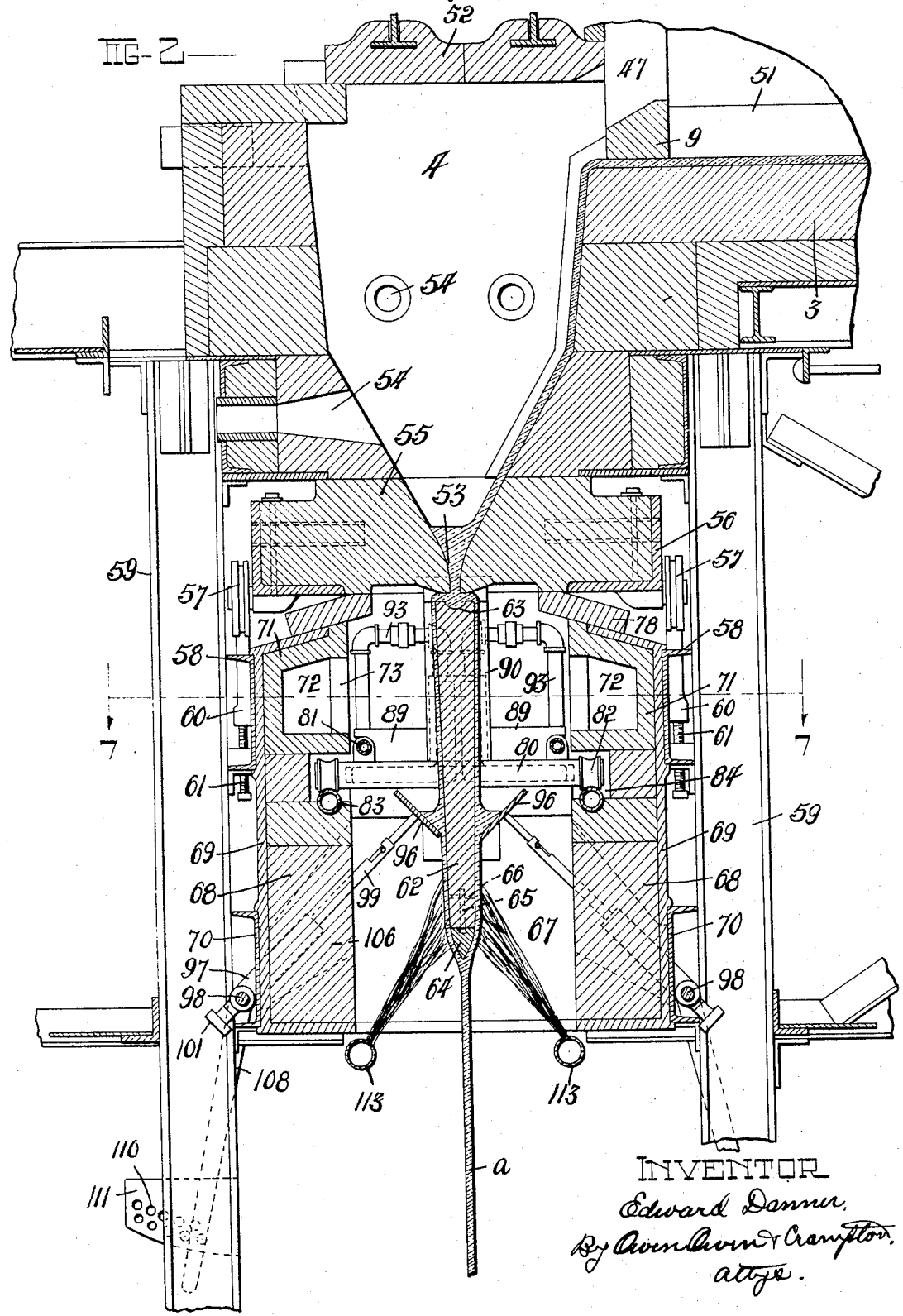

Dec. 20, 1932.  E. DANNER  1,891,370
METHOD AND APPARATUS FOR MANUFACTURING GLASSWARE
Filed May 23, 1922  10 Sheets-Sheet 3
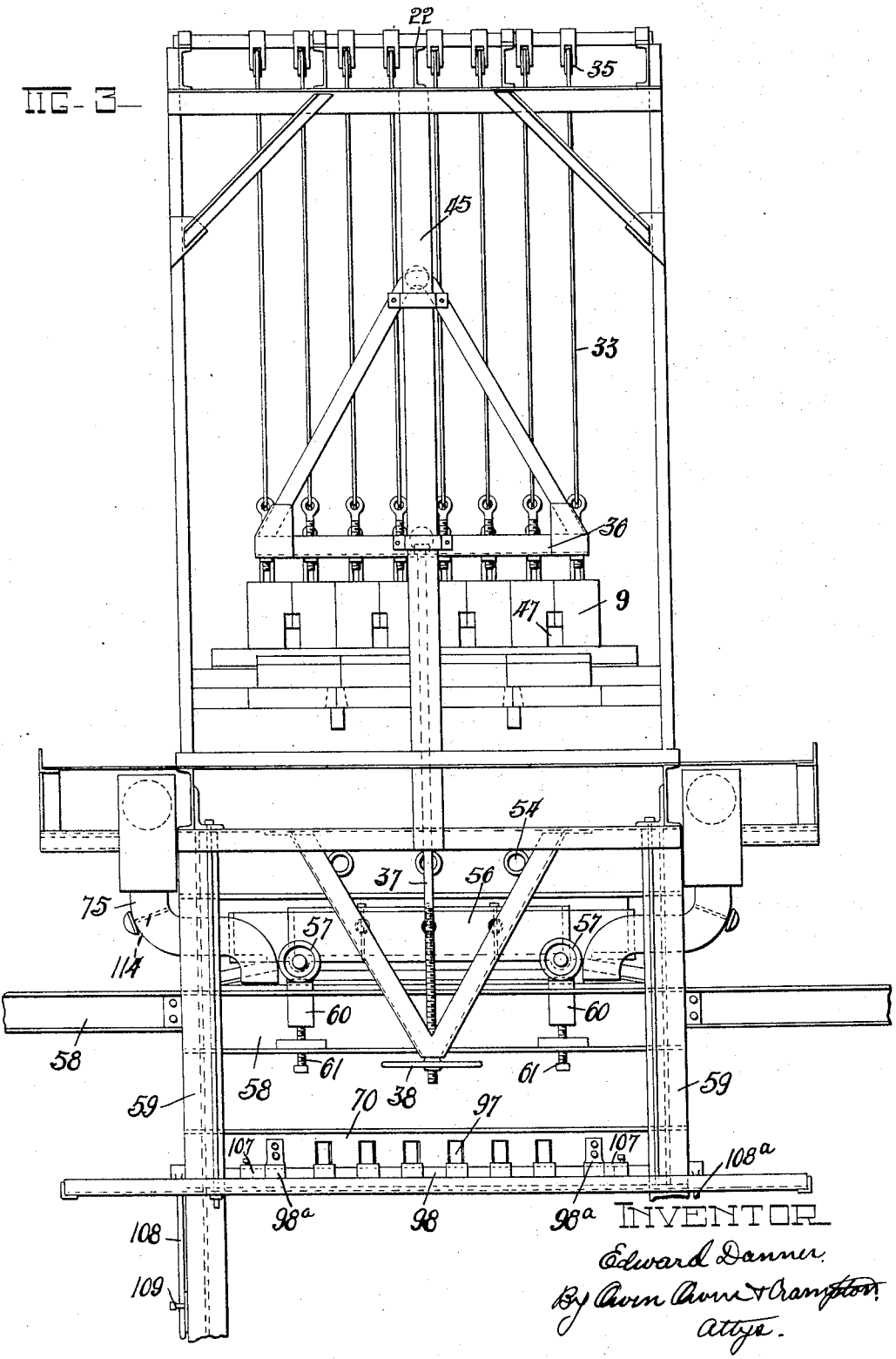

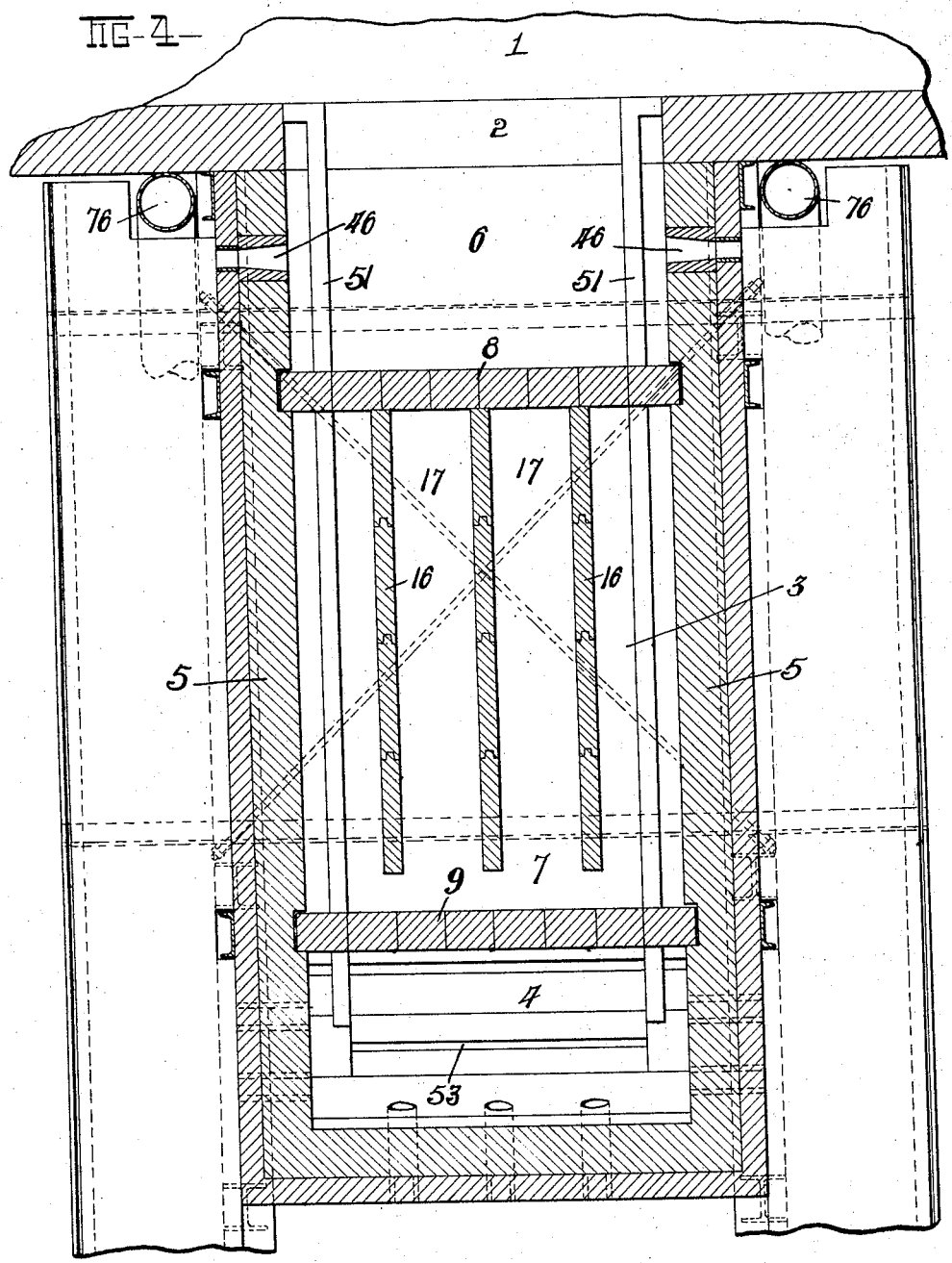

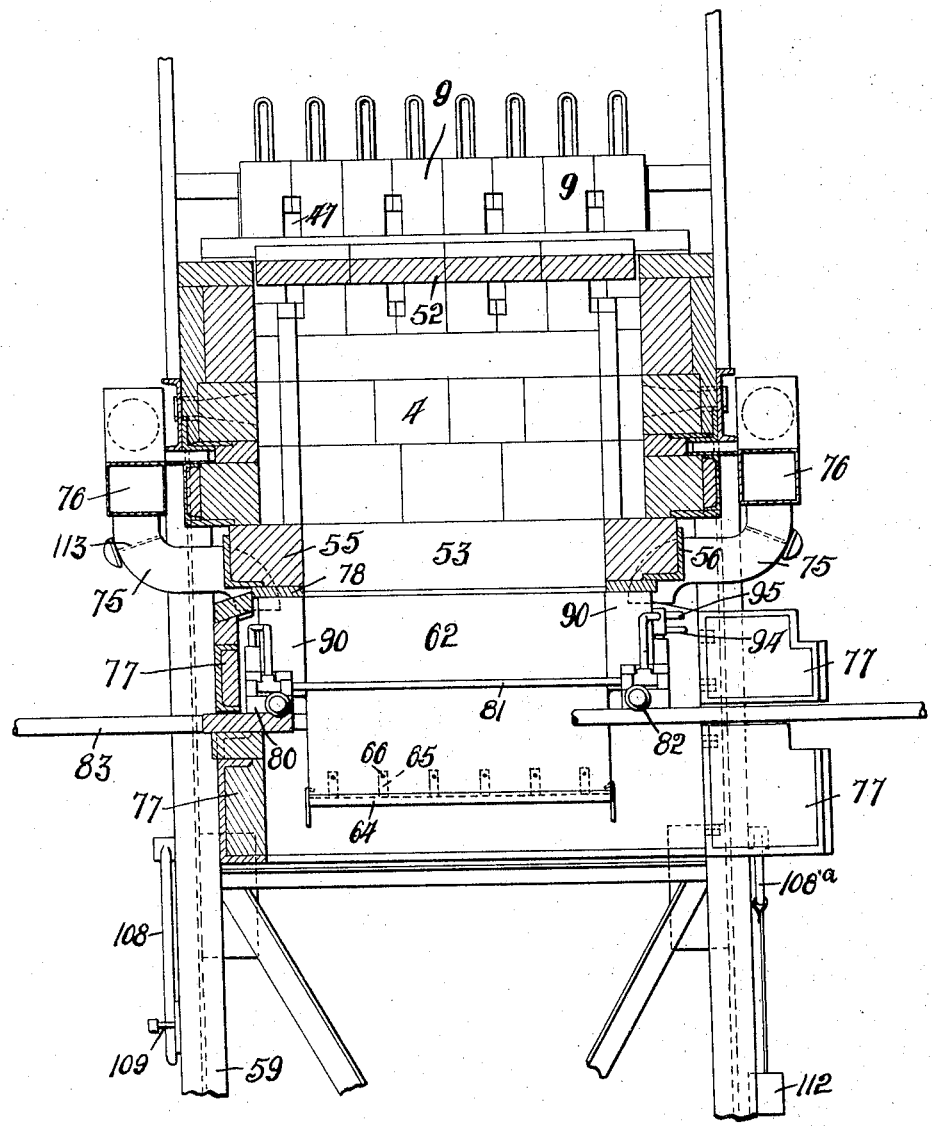

Dec. 20, 1932.　　　　　E. DANNER　　　　　1,891,370
METHOD AND APPARATUS FOR MANUFACTURING GLASSWARE
Filed May 23, 1922　　　10 Sheets-Sheet 6
FIG-5ª
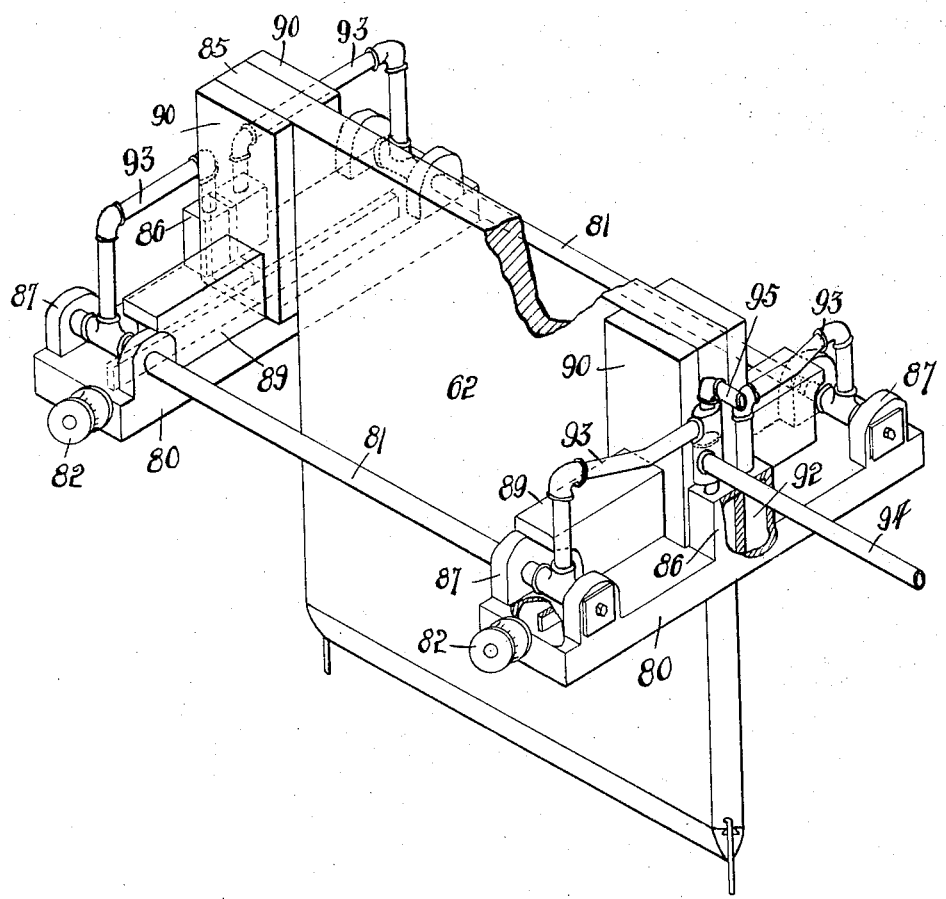
INVENTOR
Edward Danner.
By Owen Owen & Crampton
Attys.

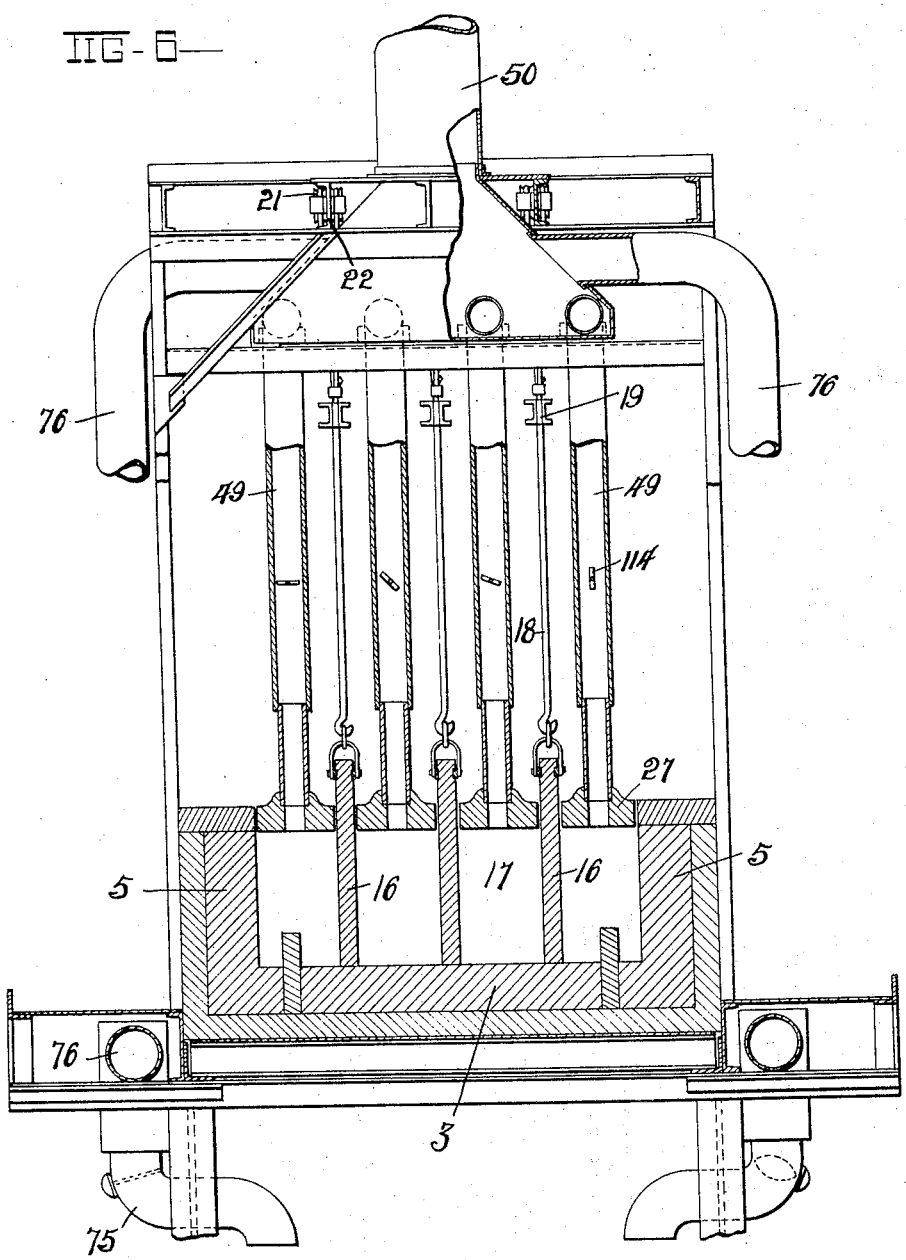

Dec. 20, 1932.  E. DANNER  1,891,370
METHOD AND APPARATUS FOR MANUFACTURING GLASSWARE
Filed May 23, 1922  10 Sheets-Sheet 8
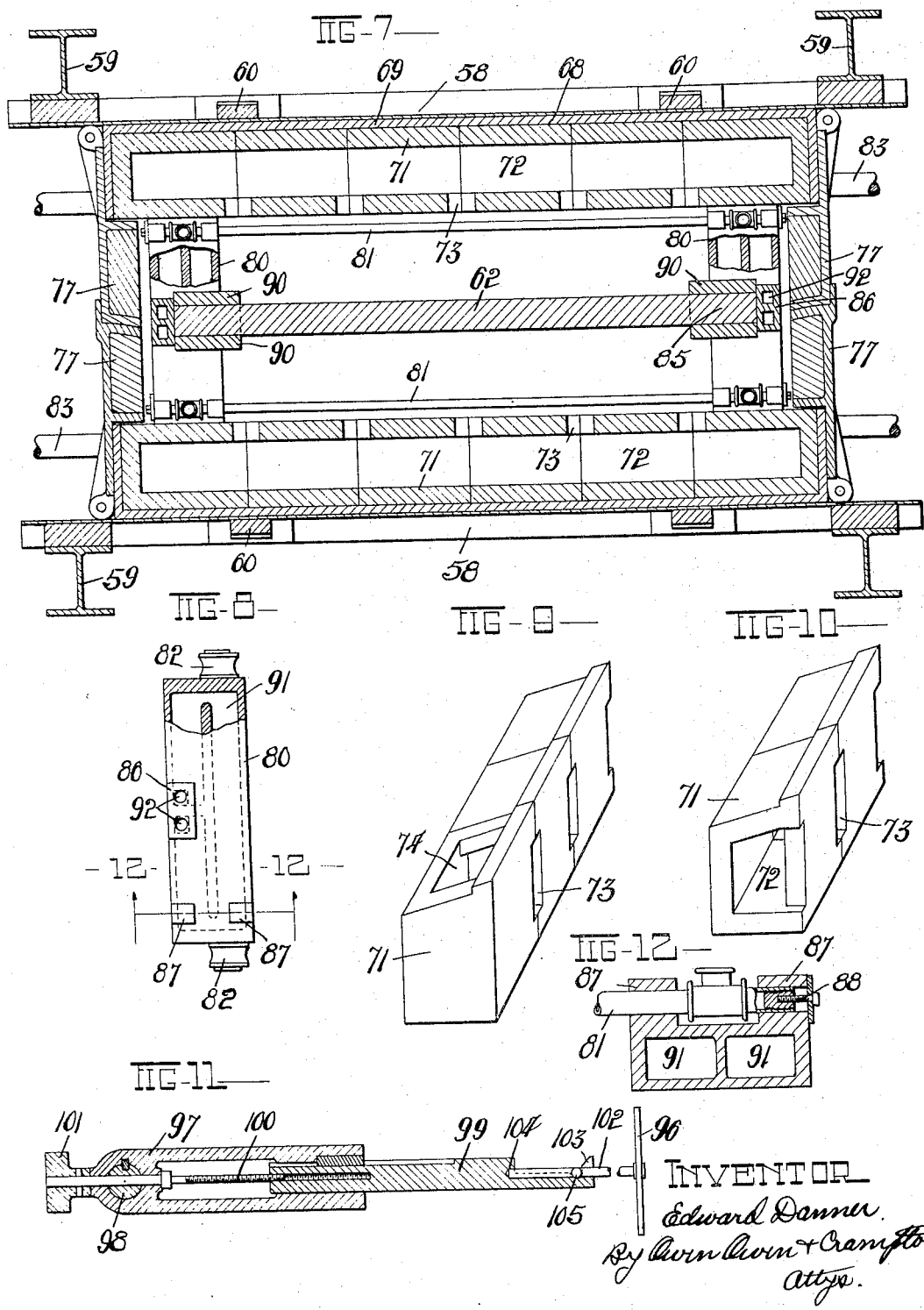

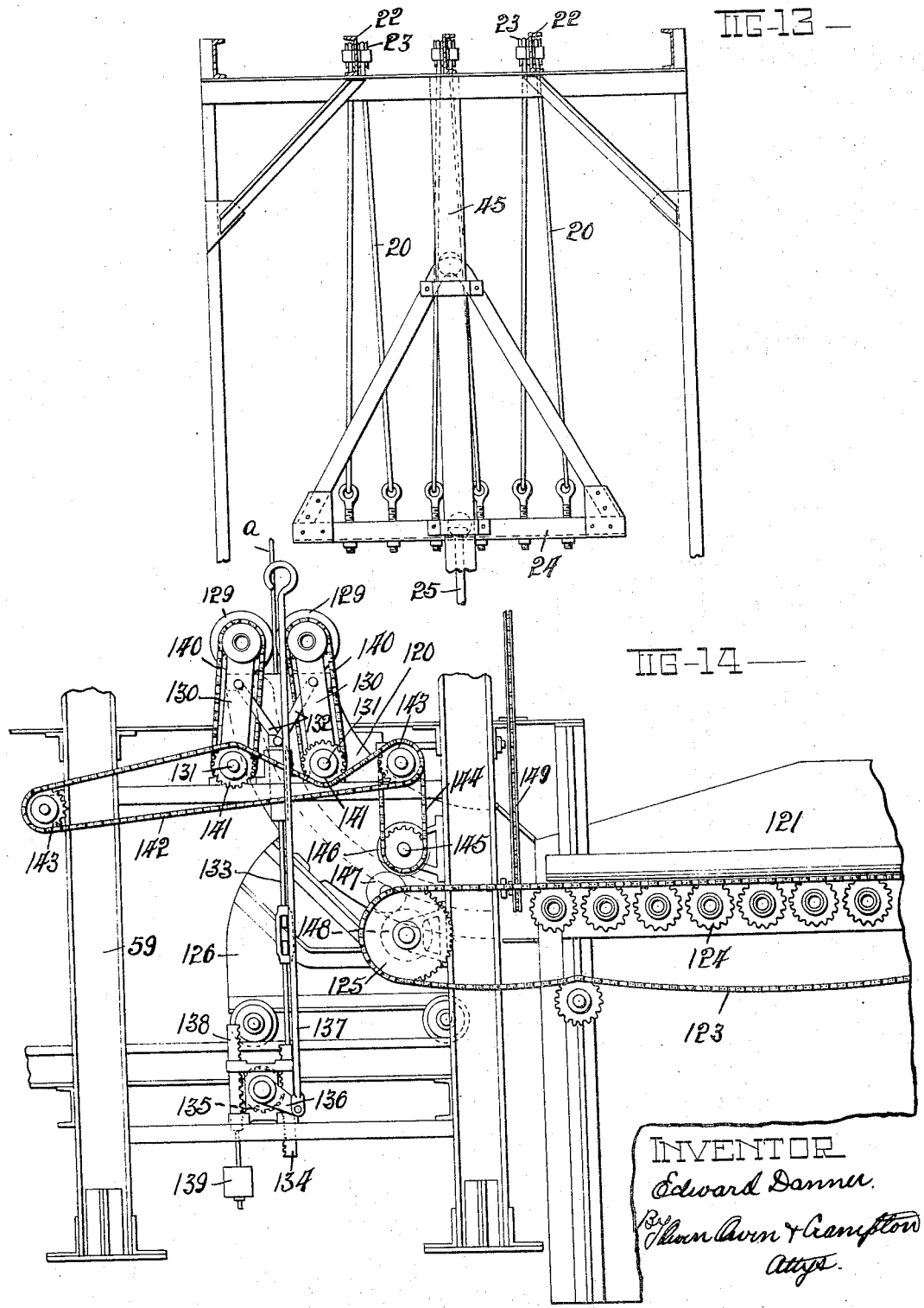

Dec. 20, 1932.  E. DANNER  1,891,370
METHOD AND APPARATUS FOR MANUFACTURING GLASSWARE
Filed May 23, 1922  10 Sheets-Sheet 10
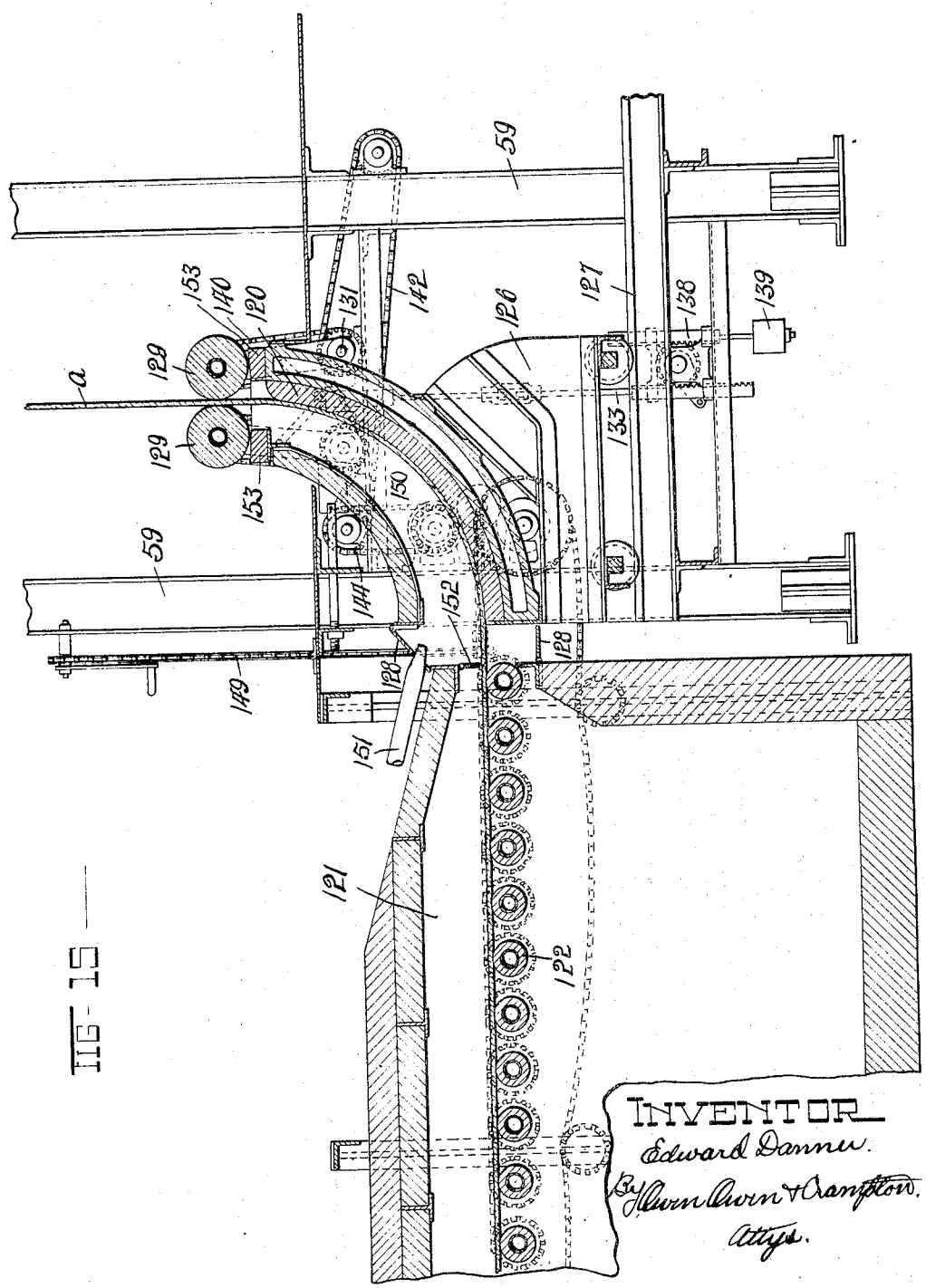

Patented Dec. 20, 1932

1,891,370

UNITED STATES PATENT OFFICE

EDWARD DANNER, OF TOLEDO, OHIO

METHOD AND APPARATUS FOR MANUFACTURING GLASSWARE

Application filed May 23, 1922. Serial No. 563,107.

This invention relates to the manufacture of glassware in continuous form, and particularly to the manufacture of flat sheet glass.

In the manufacture of sheet glass it is common to flow glass in shallow stream form over a trough or directing member and through, what is commonly termed, a tempering chamber, to impart a proper and uniform temperature condition to the glass stream preparatory to forming the glass in sheet form. It is found in practice that glass flowing in a broad stream some times tends to run in a channel or channels that is, there may be a portion or portions in the width of the stream that would flow faster than the glass on either side thereof, or vice versa. Where this condition occurs it is objectionable and hard to overcome unless the temperature is raised to a high degree throughout the chamber in order to soften all of the glass to the same plasticity, and even this may not entirely overcome the objection. By so increasing the heat in the tempering chamber the correct or desired tempering condition of the glass is temporarily lost and the continuous formation of the sheet interrupted. This channeling of the glass is more likely to occur when the glass at the source is at a very high temperature thereby requiring a considerable reduction of such temperature before the glass reaches the forming point. An object of the invention is the provision of a means or condition within the tempering chamber whereby this objectionable channeling action is overcome in a simple and efficient and economical manner.

It is further found that fine lines some times occur on the surface of the glass sheet due to the tempering conditions and from other causes, thus lowering the quality of the sheet, and also that slight variations in the uniformity of flow or thickness of the glass stream may occur, resulting in a sheet of irregular thickness. An object of my invention is the provision of simple means for overcoming or remedying such objections so that sheet glass of high grade and uniform quality may be formed.

Further objects and advantages of the invention will be apparent from the following detailed description and from the accompanying drawings, which latter illustrate what I now consider to be a preferred embodiment of the invention, but which may be changed or varied in numerous respects without departing from the invention.

In the drawings, Figure 1 is a central vertical longitudinal section of an apparatus embodying the invention with parts broken away and parts in full. Fig. 2 is a similar enlarged section of the sheet forming portion of the apparatus with parts broken away. Fig. 3 is a front elevation of the apparatus with parts broken away. Fig. 4 is an enlarged horizontal section of the apparatus on the line 4—4 in Fig. 1. Fig. 5 is an enlarged vertical section on the line 5—5 in Fig. 1, with parts broken away. Fig. 5$^a$ is an enlarged perspective view of the sheet forming slab and its carrying truck, with parts broken away. Fig. 6 is an enlarged section on the line 6—6 in Fig. 1, with parts broken away. Fig. 7 is a cross-section on the line 7—7 in Fig. 2, with parts broken away. Fig. 8 is a top plan view of one of the cross members of the slab carrying truck with a part broken away. Figs. 9 and 10 are different perspective views of the hollow flue forming blocks encircling a portion of the sheet forming chamber. Fig. 11 is an enlarged central longitudinal section of one of the adjustable sheet thickness equalizing members with a part broken away. Fig. 12 is an enlarged section on the line 12—12 in Fig. 8. Fig. 13 is an enlarged section on the line 13—13 in Fig. 1. Fig. 14 is a fragmentary side elevation of the sheet carrying away means, and Fig. 15 is a central vertical section of such means.

Referring to the drawings, 1 designates a furnace or other suitable source of molten glass supply having a discharge opening 2 in its front end. A trough 3 extends forward a considerable distance from the discharge opening 2 to direct the flow of molten glass in a relatively thin broad stream from the furnace to a hopper 4. The trough 3 has the side walls 5 extending throughout the length thereof and forming the respective sides of the hopper 4, and these side walls cooperate with a roof structure and with the bottom of the trough to form an elongated tempering passage for the glass stream flowing therethrough. The trough passage is divided into a rear or initial tempering chamber 6 and a forward or main temperature control or equalizing chamber 7 by gates 8 and 9, the former being disposed adjacent to the furnace discharge opening 2 but in forward spaced relation thereto to form the chamber 6 therebetween, and the latter being disposed at the forward end of the trough. The roof of the chamber 6 is formed, in the present instance, by a plurality of blocks 10 hung on or supported by cross T-bars 11, which rest at their ends on the side walls 5 of the trough. A set of blocks 12 are also removably suspended by rods 13 between the blocks 10 and gate 8 and may be easily removed to render access to the interior of the chamber 6 when desired. The rods 13 are suspended from a cross-frame bar 14 supported by the overhead framework 15 of the apparatus.

The main tempering chamber 7 is divided transversely thereof preferably throughout nearly its entire length by a plurality of partitions 16 into a plurality of longitudinally extending sectional or zone tempering portions 17 that may be separately heated so that the temperature in the different sections or zones may be regulated to suit the condition of the glass therein. The tendency of the glass stream flowing over the trough is to cool more rapidly at the side edge portions thereof so that the glass tends to run in a centrally disposed channel. By dividing the same into separate tempering zones by the use of the partitions 16 the temperature of the cooler portions of the glass stream may be raised to equalize or control the temperature thereof with respect to other portions of the stream. The partitions 16 are illustrated as suspended within the chamber 7 and may either extend to the bottom of the chamber to divide the glass into separate streams as it flows over the trough, or the partitions may be disposed slightly above the glass stream so as to only divide the portion of the chamber 7 above the stream into separate tempering zones.

Each partition 16, in the present instance, comprises a plurality of block sections or slabs, each of which is suspended by an individual hanger 18 from bars 19, one of which is provided for each partition and is disposed over the same longitudinally thereof. Each bar 19 is adjustably suspended by cables 20 connected to either end thereof and extending upward therefrom over sheaves 21 secured to a longitudinally extending top frame bar 22, the cables then extending forward along opposite sides of said bars around sheaves 23 and thence down to a point where it connects with a vertically adjustable frame member 24. A rod 25 extends downward from the member 24 through a subjacent part of the structure and has a hand controlled wheel 26 threaded to its lower end to facilitate adjustment of the cables and partitions to which attached.

A set of roof blocks 27 is disposed between the partitions 16, or the walls 5 and adjacent partitions, to close the top of the chamber 7, said blocks being carried by T-bars 28, which rest at their front ends on a cross-bar 29, which is supported at its ends by the side walls 5 of the trough. The rear ends of the bars 28 are suspended by hanger rods 30, which are suspended from a top frame bar 31. The partitions 16 preferably terminate short of the front gate 9 and the space between their forward ends and the gate is closed by a cross-piece 32 suspended from the cross-bars 29 by bolts or in any other suitable manner.

The gate 8 is preferably composed of a plurality of separate blocks or slabs to regulate the amount of glass flowing into each section or zone 17, and each slab is carried by a respective cable 33, which extends upward therefrom over a sheave 34 on the superstructure and thence forward over a sheave 35 at the forward end of such structure and down to a point where it connects to a vertically adjusting frame 36, which frame has a rod 37 projecting downward therefrom and provided with a hand adjusting wheel 38 threaded thereon, whereby a turning of the wheel on the rod will effect a raising or lowering of the frame 36 and corresponding adjusting movements to the gate slabs 8 in unison. The gate 9 is also composed of a plurality of slabs and each is carried by a respective cable 39, which extends up over a respective sheave 40 on the superstructure and thence forward and downward over a sheave 41 to an adjusting frame 42. A rod 43 extends downward from the frame 42 and is provided with an adjusting hand wheel 44, which is threaded thereto. Each of the adjusting frames 24, 36 and 42 is guided for vertical movements by a respective upright bar 45 of the framework, as best shown in Fig. 3. It is thus evident that the gates 8 and 9 and partitions 16, and the blocks or sections forming them, are each adjustable to suit the depth and temperature requirements of the stream flowing over the trough.

The chamber 6 is provided in its opposite sides with burner receiving openings 46 whereby the interior temperature thereof may be regulated, and the gate 9 is provided with a plurality of narrow vertically elongated openings 47 through which flames may be directed from burners 48 into the respective zone portions 17 of the main tempering chamber 7. Each zone portion 17 of the chamber 7 has a flue 49 extending upward from its rear end and in communication with a main flue 50. Either gate 8, 9 may be used to regulate the depth of the glass stream flowing over the trough. Inasmuch, however, as a thin stream is more susceptible to temperature conditions, it is preferable to use the gate 8 to regulate the depth of stream flowing through the main temperature control or equalizing chamber 7.

The bottom of the trough 3 is provided along each side edge thereof, in slightly spaced relation to the respective side walls 5, with stream confining ribs or flanges 51, which extend from the furnace opening 2 to the forward end of the trough and then a distance into the hopper 4 down the rear wall thereof. These flanges are of shallow form and provide a space between the side edges of the glass stream flowing through the trough and the side walls of the trough thereby preventing the cooling action of the side edge portions of the stream which would otherwise be present if the glass had contact directly with the side walls.

The hopper 4 is closed at its top by roof slabs 52 and has its bottom extending a distance below the discharge end of the trough 3 and of V-form to provide a narrow elongated bottom discharge slot or opening 53. The side and front walls of the hopper are provided with burner receiving openings 54 to facilitate interiorly heating the hopper chamber, and a portion of the heat within the chamber is intended to pass therefrom through the openings 47 of the front trough gate 9 into the forward end portion of the trough tempering chamber 7. The discharge opening 53 of the hopper is formed by lip tile or blocks 55 which are mounted in a bottom or truck frame 56 and are capable of removal as a unit with the frame from the bottom of the hopper for replacement or repair of the blocks, as desired. To facilitate such a removal the frame 56 is provided at its front and rear sides with wheels 57 which when the lip tile are lowered slightly from engagement with the hopper bottom are adapted to rest on track bars 58 for travel lengthwise thereof. These bars are secured to the inner sides of the frame uprights 59, which support the hopper and trough structure, and the bars 58 extend in either direction from the uprights 59 a desired distance to permit the truck forming the hopper discharge opening structure to be moved into accessible position at either side of the hopper. When the lip tile are in position for the discharge opening 53 thereof to register with the bottom opening of the hopper, the wheels 57 rest on blocks 60, which extend up through the rails 58 and are vertically adjusted by screws 61 to raise the lip tile into close contact with the stationary bottom portion of the hopper.

The glass in its discharge from the hopper discharge opening 53 flows directly onto the upper end of a vertically disposed slab 62, which divides the glass stream into two films that flow down opposite sides of the slot and merge and flow in single sheet form from the lower end of the slab substantially the same as in my former application Ser. No. 443,752, filed February 10, 1921. The upper end of the slab is disposed in slightly spaced relation to the lower edge wall of the discharge opening 53 so that the glass flows directly thereon from the discharge opening and then divides with portions flowing in thin film form over each of the opposite edges of the slab and down the respective sides thereof, the thickness of the films being regulated by the space between the slab and the lip edges of the tile 55. In my said former application the upper end of the slab 62 is flat, and with this construction it is found in some cases that the glass may flow entirely or almost entirely over one edge and side surface of the slab instead of uniformly dividing and flowing over both edges and side surfaces of the slab. To obviate this I provide the upper end of the slab 62 with a channel 63 extending longitudinally thereof in vertical register with the discharge openings 53 so that the stream of glass discharging from the hopper is directed into the channel 63 and then overflows both edges thereof in a substantially uniform manner. The channel 63 is preferably of circular form in cross-section.

The slab 62 terminates at its lower end in a sharp edge and is preferably provided at such end with a metal tip 64 of chromel or other suitable high heat resisting metal. This tip is secured to the slab by a plurality of metal strips 65 which extend up into the slab and are anchored therein by cross pins 66. The lower ends of the strips 65 project below the slab and are of dove tail form to loosely enter a dove tail groove in the upper side of the tip, thus holding the tip to the slab and at the same time permitting it to move on the suspending strips 65 relative to the slab as the difference in contraction and expansion of the metal of the tip and the material of the slab, which is usually of clay, may require.

The slab 62 is disposed within a final tempering chamber 67, which has its bottom open and is formed by a surrounding wall 68. This wall is formed, in the present instance, at front and rear by metallic frame parts 69, which are supported between the standards 59 by the rails 58 and cross frame bars 70, and these frames are lined with fire brick or other suitable heat resisting material. The lining within the upper portions of the frame 69 preferably comprises hollow blocks 71 forming a wall passage 72 which has openings 73 to the upper interior portion of the chamber 67 and have one or more openings 74 (Fig. 9) in the top thereof with which flues 75 communicate. The flues 75 open into flues 76 running lengthwise of the furnace structure and communicate at their rear ends with the main flue 50. The opposite side walls of the tempering chamber 67 are formed, in the present instance, by gates 77, which are adapted to be opened to permit side access to the chamber 67 and also to permit side removal of the slab 62 therefrom. The chamber wall 68 is spaced at its top from the bottom of the lip blocks 55 to permit a lowering of the blocks when removing the same from the hopper bottom and this space is intended to be closed by removable blocks 78 mounted on top of the wall 68.

To facilitate removal of the slab 62 from the tempering chamber 67, it is carried by a truck, which comprises cross-bars or members 80 at its opposite ends and side bars 81 of hollow or pipe form, which rigidly connect the cross-bars 80 at the ends thereof. The cross-bars 80 are provided at their ends with rolls 82, which travel on track-bars 83 mounted lengthwise of the front and rear walls of the chamber 67 in recesses 84 provided therein and extend at their ends without the opposite ends of the chamber 67 to permit the truck to be moved outward from the chamber at either side or end thereof through openings provided in the chamber walls by an opening of the gates 77. The slab 67 is provided at its upper end portion with side extensions or arms 85 which extend over and rest on the respective carriage cross-bars 80. Each cross-bar has an upright 86 at its outer edge portion centrally of its ends, which is intended to have side abutment against the outer end of the respective slab extension or wing 85 so that a drawing of the cross-bars 80 toward each other by a tightening of the side connecting bars 81 will draw the uprights 86 in opposed clamping engagement against the slab extensions 85. The side connecting bars or pipes 81 extend through corner lugs 87 at the respective ends of the cross-bars, and the side bars are adjustably connected to the outer lug of a pair with which they are engaged by a screw 88 (Fig. 12). It is thus evident that a tightening of the screws 88 will draw the cross-bars 80 toward each other into holding engagement with the slab 62.

The slab 62 is held against movement longitudinally of the cross-bars 80 by blocks 89 which are inserted between the lugs 87, or one of the lugs of each set, and a thin facing block 90 which bears at its inner side against the respective side of the adjacent slab extension 85. The blocks 90 extend from the upper end of the slab 62 to the respective carriage cross-bars 80 and serve as gauge members for confining the flow of the glass therebetween in its passage down the upper portion of the slab. After the glass has passed down below the cross-bars 80, it may flow around and encompass the side edges of the slab.

To facilitate a cooling of the different parts of the slab carriage, each cross-bar 80 has a passage 91 provided lengthwise therein with its end portions lapping back upon itself and separated from each other, but each communicating with a separate vertical passage 92 in the upright 86 of the cross-bar. Each side bar 81 is of hollow or pipe form to permit the passage of a cooling fluid therethrough and is connected at each end by a loop 93 (Fig. 2) with the adjacent side passage 92 of the associated upright 86. A fluid inlet pipe 94 is in communication with one of the passages 92 of the cross-bar upright 86 and an outlet pipe 95 is in connection with the other passage 92 of such upright. With this arrangement it is evident that the cooling fluid enters one of the passages 92 of a set, flows downward therethrough into the cross-bar channel 91 lengthwise of the cross-bar and then passes therefrom through the other upright passage 92 of the set and to one of the side bars 81 through the adjacent pipe loop 93. The fluid then passes from such side bar through the pipe loop at its other end down through one of the passages 92 of the other cross-bar of the carriage, thence around the interior of such cross-bar and downward therefrom through the other passage 92 and to the other side bar 81 through a connecting pipe loop 93. The fluid then flows from the last mentioned side bar through a pipe loop at the other end thereof out through the outlet pipe 95 connected to such loop. The track bars 83 for the carriage are preferably made hollow to permit the circulation of a cooling fluid therethrough.

It is evident that upon an opening of the gates 77 at either side of the final tempering chamber 67, a slab and its carriage may be removed from the chamber or introduced therein as a unit. With this arrangement, when it is desired to remove a slab 62 from the chamber 67 for repair or substitution, the slab may be removed from one side of the chamber and another previously heated slab quickly introduced into the chamber from the opposite side thereof without necessitating a shutting down of the furnace other than merely stopping the flow of the glass. By bringing the substituted slab up to approximately the desired working temperature before introducing it into the chamber saves the delay which would otherwise be incident to thoroughly heating the slab after the change has been made.

A thickness gauging blade 96 is disposed within the tempering chamber 67 at each side of the slab 62 in upwardly and outwardly inclined relation thereto with its lower edge parallel to the adjacent side of the slab and spaced therefrom an extent corresponding to the desired thickness of the glass stream flowing down the slab side. The blades 96 are coextensive in length with the width of the slab and cooperate with the slab to form pockets at each side thereof in which a portion of the glass flowing down the slab may gather and which gathered portion then flows from the discharge slot or opening of the pocket in a newly formed stream or film down the remaining portion of the slab. The blades 96 in addition to forming thickness gauging means for a film of glass flowing down the slab also impart a uniform thickness to the films throughout their width and cause any lines which may form on the surface of the films flowing down the upper portion of the slab to lose themselves in the glass which is sustained by the blades. The newly formed films which flow from the glass gathered in the blade pockets are free from such surface lines and they are not very likely to again form on the glass films before merging into the sheet flowing from the end of the slab.

Each blade 96 is carried by a plurality of arms 97 for swinging movements therewith about the axis of a supporting shaft 98 and has adjusting movements longitudinally of the arms to enable its position with respect to the slab to be varied as the working conditions may require. The arms 97, in the present instance, are made in two sections with the outer section 99 (Fig. 11) telescoped within the inner section for movements longitudinally thereof, and engaged by a screw 100 whereby a turning of the screw will impart adjustment to one section relative to the other. The screw 100 extends from the inner end of the arm and has a turning knob 101 at its outer end. Each blade 96 has a plurality of stems 102 projecting therefrom and resting in a forked end portion 103 of the arm section 99 with its free end removably inserted into a shallow socket 104 in the section. A cross-pin 105 is provided on each stem 102 and coacts with the inner edge of the forked portion 103 to prevent a longitudinal withdrawal of the stem from engagement with the arm section, but permitting the stem to be raised from engagement therewith. Each shaft 98 is journaled in bearings 98a secured to the frame bars 70, and the arms 97 project inward from the shaft through vertically flaring openings 106 in the front and rear walls of the chamber 67. To facilitate removal of the shaft 98 and its arms from the chamber wall, the shaft is provided with two removable end sections which are secured to the center section by sleeves 107. An operating lever 108 projects down from an end of each shaft 98 and is held in adjusted position by a pin 109 inserted into any one of a series of holes 110 in a bracket 111 secured to an adjacent upright 59 (Figs. 2 and 3). The opposite end of the shaft 98 is preferably provided with an arm 108a having a weight 112 which acts to partially counterbalance the weight of the arms.

The tempering chamber 67 is heated by flames from burners 113 disposed at the lower end thereof at opposite sides of a sheet flowing from the slab, the flames from the burners being preferably directed against the glass films at or adjacent to the point where they leave the lower end of the slab. The heat from the burner flames rises in the tempering chamber and passes therefrom into the wall passages 72 and thence through the flues 75 and 76 to the main flue 50. These flues, as well as the flues 49 from the tempering chamber 7, are provided with controlling dampers 114.

The formed sheet a which flows from the lower end of the slab 62, after becoming sufficiently cooled to prevent surface marring, passes through a chute-like deflecting member 120 by which its course is changed in a curve from a generally vertical to a generally horizontal direction, the sheet then passing through a leer 121 wherein it is supported and fed forward at its forming speed by a set of rollers 122. The rollers 122 are driven in unison by a chain 123 engaging sprocket wheels 124 thereon and passing at its ends around guide sprocket wheels 125, one of which is shown. This chain is connected to any suitable source (not shown).

The deflecting member 120 is supported by a carriage 126 for movement toward and away from the inlet end of a lear 121 on a track 127 supported, in the present instance, between the lower ends of some of the frame uprights 59. The space between the outlet end of the member 120 and inlet opening of the leer is closed by a plurality of gates 128. A pair of opposed feed control rolls 129 for the sheet a is mounted at the upper inlet end of the member 120 for supporting engagement with opposite sides of the sheet when it is desired to partially support or counteract the weight of the sheet. The speed of rotation of these rolls is regulated in any suitable manner to cause them to regulate the speed of gravity flow of the glass from the slab. It is apparent that the deflecting of the sheet by the member 120 also has a supporting or retarding action on the flow of the sheet from the forming means. It is found in practice that it is necessary to employ some means to partially support the weight of the sheet to retard its flowing action when the sheet extends any considerable distance downward from the flowing point, as otherwise the weight of the sheet is such as to cause the sheet to flow at too great a speed and to be thinned too great an extent.

In order that the rolls 129 may be placed in engagement with the sheet a only when desired, each is carried by a set of rocking arms 130 mounted for swinging movements toward and away from the sheet on shafts 131 mounted in the frame-work below the rolls 129. Adjacent arms 130 of the sets are connected by toggle links 132 and a rod 133 extends from the pivotal point of connection of the link and is provided at its lower end with a vertically movable rack bar 134. A pinion 135 engages the rack bar 134 and its shaft is provided with a rocker arm 136 to which an operating rod 137 is connected. It is evident that a movement of the control rod 137 to rock the arm 136 will impart longitudinal movement to the rack 134 and communicate an opening or closing movement to the arms 130 so as to place the rolls 129 into or out of feeding engagement with the sheet. A second rack bar 138 engages the pinion 135 in opposition to the rack bar 134 and is weighted, as shown at 139, to regulate the pressure of the rolls against the sheet. Each shaft 131 and the associated roll 129 are in chain and sprocket wheel connection 140 to cause a driving of one from the other, and each shaft 131 has a sprocket wheel 141 mounted thereon, one wheel being engaged at one side and the other wheel at the other side by a drive chain 142 to cause a movement of the chain to drive the wheels 141 in opposite directions. The chain 142 is guided by sprocket wheels 143 and the shaft on which one of such sprocket wheels is mounted is in chain and sprocket wheel connection 144 with a subjacent shaft 145. The shaft 145 has a friction wheel 146 fixed thereto and adapted to be engaged by an idler friction wheel 147, which in turn is adapted to engage and be driven by a friction wheel 148 on the shaft with one of the sprocket wheels 125 so that power for driving the rolls 129 is received from the sprocket chain 123. The idler wheel 147 is movable into and out of engagement with the wheels 146 and 148 by a suitable mechanism, the movement of which is controlled by the movement of a sprocket chain 149.

The deflecting member 120 forms a chamber 150 through which the sheet *a* passes and by one curved wall of which it is deflected from vertical to horizontal and this chamber is heated the desired extent by flames from one or more burners 151 directed therein, in the present instance through the upper gate 128. The temperature in the chamber 150 should be regulated to suit the softness or flexibility of the glass sheet passing therethrough, and if the condition of the sheet is such that a bending of the same would tend to wrinkle or permanently injure the sheet, the temperature within the chamber should be such as to prevent this action. This temperature depends on the conditions of each case, for the greater the distance between the slab 62 and the deflecting means 120, and the cooler the atmosphere through which the sheet passes between said parts, the higher should be the temperature in the chamber 150. The chamber is substantially closed at its lower end by the gate 128 and by a gate 152 between the said chamber and the leer chamber 121 and is substantially closed at its upper end by the rolls 129. Removable blocks 153 are provided at the upper portion of the chamber 120 and may be removed to provide additional outlet passages from the chamber for the gases of combustion.

In the use of my apparatus the glass in the tank 1 is preferably maintained at a temperature of 2000° to 2100° F. and flows at approximately such temperature into the initial tempering chamber 6 and thence in preferably a thinner stream, which is controlled by the gate 8, through the main temperature or sectional equalizing chamber 7 and into the hopper 4, the temperature of the glass being gradually lowered in its passage through the different tempering chambers to a temperature of approximately 1800° F. in the hopper. The temperature of the glass is further lowered in its passage through the final tempering chamber 67 to approximately 1500° F. at the point of its flow from the slab. The purpose of the initial tempering chamber 6 is to impart, as nearly as possible, a predetermined uniform temperature condition to the glass after leaving the furnace 1 irrespective of the temperature of the glass in the furnace, as this temperature may vary from time to time. The temperature of the glass can either be raised or lowered in the chamber 6 to give it the proper temperature before passing the chamber 7 and hopper 4. The temperature of the glass is then lowered and further equalized or maintained equal in its passage through the chamber 7 and hopper 4. The division of the chamber 7 into longitudinally extending tempering zones enables a more efficient equalizing or equal maintaining of the temperature of the glass stream than would otherwise be possible, as the temperature in the different zones may be so regulated as to take care of any unequal temperature or flowing conditions in different portions of the glass stream transversely thereof. It is found in practice that glass flowing in a broad shallow stream sometimes tends to run in a centrally disposed channel so that the glass along the side edges thereof becomes cooler or more sluggish than the glass at the central portion of the stream. This condition is remedied by the provision of the different tempering zones which are spaced transversely of the stream and enable the glass in each zone to be given the temperature desired without affecting the glass in the other zones. The partitions 16, which form the several tempering zones, are vertically adjustable so that they may be lowered to effect a division of the glass stream as it flows through the several zones or they may be raised to a point above the surface of the glass so that no division of the stream is effected. While I have stated different specific temperatures for the glass in different portions of the apparatus, it will be understood that these temperatures are given merely for the purpose of illustration and not to limit the practicing of the invention to any specific temperatures within the different parts thereof. The glass flows from the discharge opening 53 of the hopper down onto the top edge of the sheet forming slab 62 where it is divided into two thin film-like streams which flow down opposite sides of the slab and merge at the lower end thereof into a single sheet a which flows by gravity therefrom. The outer surfaces of the films flowing down the slab are engaged by the lower straight edges of the blades 96 to cause a gauging of films to a uniform thickness throughout their width. This also obliterates streaks and lines which sometimes occur in the surfaces of a forming sheet at certain temperatures. The plates 96 are of a flexible nature and are supported by a plurality of arms which are separately adjustable to permit an adjustment of the plates to compensate for any warping or irregularity in the surfaces of the slab.

Two important features of the invention reside in the ease and rapidity with which the lip blocks 55 forming the hopper discharge opening 53 and the sheet forming slab 62 may be removed from the structure and replaced with substitute parts. To remove the lip block 55 the filling blocks 78 are first removed from the space between the lip block and the top of the final tempering chamber wall 68, after which the lower screws 61 are turned down to lower the roll elevating blocks 60 sufficiently to enable the rolls 57 to rest on the track bars 58, thus permitting the lip block to be moved to one side and another lip block moved into place from the opposite side of the hopper. The slab 62 may also be quickly moved into or out of the tempering chamber 67 through the gate closed side openings thereof without stopping the running of the furnace other than to close one of the gates 8 or 9 to temporarily stop the flow of glass.

I wish it understood that my invention is not limited to any specific construction, arrangement or form of the parts, or to any specific combination of elements, as it is capable of numerous modifications and changes without departing from the spirit of the claims.

Having thus described my invention, what I claim as new, and desire to secure by Letters Patent, is,—

1. Apparatus for forming sheet glass comprising a source of supply of molten glass, a sheet forming device, and means for conducting glass in a broad shallow stream from said source to said device, said means comprising a floor over which said stream flows, side walls and cover members forming a substantially enclosed passageway above said stream, and a partition within the glass parallel with and spaced not far from each side wall.

2. Apparatus for forming sheet glass comprising a source of supply of molten glass, a sheet forming device, and means for conducting glass in a broad shallow stream from said source to said device, said means comprising a floor over which said stream flows, side walls and cover members forming a substantially enclosed passageway above said stream, and a partition within the glass parallel with and spaced not far from each side wall and substantially segregating said flowing stream from substantially quiescent glass next to said walls.

3. Apparatus for forming sheet glass comprising a source of supply of molten glass, a sheet forming device, and means for conducting glass in a broad shallow stream from said source to said device, said means comprising a floor over which said stream flows, side walls and cover members forming a substantially enclosed passageway having a roof above said stream, and a partition within the glass parallel with and spaced not far from each side wall, and parallel longitudinal partitions above the glass and below the roof.

4. Apparatus for forming sheet glass comprising a source of supply of molten glass, a sheet forming device, and means for conducting glass in a broad shallow stream from said source to said device, said means comprising a floor over which said stream flows, side walls and cover members forming a substantially enclosed passageway having a roof above said stream, and a partition within the glass parallel with and spaced not far from each side wall, and parallel longitudinal partitions above the glass and below the roof, the partitions within the glass being nearer the side walls than any of the partitions above the glass.

5. In an apparatus of the class described, means for directing the flow of molten glass in shallow broad stream form from a source of supply to a sheet glass forming point, said means forming a plurality of successive tempering chambers for the stream, partitions parallel with the flow of glass and dividing one of said chambers into a plurality of separate tempering zones, and temperature regulating means for the separate chambers and tempering zones.

6. In an apparatus of the class described, a source of molten glass supply, means forming a passageway for directing the flow of glass in shallow broad stream form from the source of supply to a sheet glass forming point, means for regulating the depth of flow of the glass through the passage and dividing the passage into a plurality of successive tempering chambers, partitions longitudinal of the flow of glass within one of said chambers dividing it into a plurality of separate tempering zones, and means for regulating the temperature for the different chambers and zones.

7. In an apparatus of the class described, a tank for containing molten glass and having a side discharge outlet, a trough extending horizontally from the outlet and over which glass flows from the tank in shallow broad stream form, means above the trough forming a tempering chamber, and partitions in the chamber longitudinal of the flow of glass therein and dividing the chamber into separate tempering zones, each of which is exposed to the stream flowing over the trough, means for regulating the temperature in the separate tempering zones to equalize the temperature of the stream throughout its width, and means for directing the flow of the glass after leaving the trough and permitting it to flow in continuous sheet form therefrom.

8. In an apparatus for forming continuous sheet glass, means forming a passageway for directing the flow of molten glass in a shallow broad stream from a source of supply to a ware forming point, and longitudinal partitions dividing said passageway above the glass for a portion of its length into a plurality of transversely spaced tempering zones and being adjustable with respect to the passageway.

9. In an apparatus of the class described, means forming a passageway for directing the flow of molten glass in a broad stream from a source of supply to a ware forming point, means including a plurality of vertically adjustable partitions extending lengthwise of the passageway and transversely dividing the same into a plurality of separate tempering zones, and means for controlling the temperature in the separate zones.

10. In an apparatus of the class described, means forming a passageway for directing a flow of molten glass in a broad stream from a source of supply to a ware forming point, vertically adjustable gates for dividing the passageway into a plurality of sections spaced longitudinally thereof, and longitudinally extending partition members in one of the sections dividing the same transversely into a plurality of separate tempering zones through which the stream flows, and means for regulating the temperature in the separate zones.

11. In an apparatus for forming continuous sheet glass, means forming a hopper for molten glass and having a discharge opening in its bottom, a lip-tile removably mounted at the bottom of the hopper and forming a restricted discharge opening therefrom, means for raising and lowering the lip-tile with respect to the hopper bottom and, when lowered, guiding its movement transversely from under the hopper, and means below the lip-tile with which the glass flowing therefrom engages and down and from which the glass flows in sheet form.

12. In an apparatus for forming continuous sheet glass, a hopper means into which molten glass flows from a source of supply, said means having a bottom discharge opening, a wheeled truck movably mounted below the means and having a part thereof forming the discharge opening for the hopper, and means supporting the truck for vertical and horizontal movements into and out of operative relation to the hopper means.

13. In an apparatus for forming continuous sheet glass, means forming a hopper into which molten glass flows from a source of supply and from the bottom of which it flows by gravity, a truck forming a restricted discharge opening for the hopper bottom, means carrying the truck for vertical and horizontal movements to and from operative relation to the hopper, and sheet tempering and forming means disposed below the truck.

14. In an apparatus for forming continuous glassware, means for directing the flow of molten glass in stream form from a source of supply to a ware forming point, a track disposed below the discharge end portion of said means, a truck mounted on said track for movement to operative position under the discharge portion of said means and vice versa and forming a lip-tile for the discharge end of the directing means, and means for raising and lowering the truck into and out of operative relation to the directing means.

15. In an apparatus for forming continuous sheet glass, means forming a tempering chamber, a truck movable into and out of said chamber transversely thereof and having a directing member down and from which glass flows in sheet form through the chamber, and means for directing a stream of molten glass from a source of supply onto the upper end of the truck directing means when the latter is in operative position within the tempering chamber.

16. In an apparatus of the class described, means forming a tempering chamber, means for directing the flow of molten glass from a source of supply into said chamber, a truck guided for movements into and out of the chamber transversely thereof, and a slab carried by the truck and onto which the glass from the directing means flows and from the lower end of which the glass passes by gravity in predetermined form.

17. In an apparatus of the class described, means forming a tempering chamber having a gate controlled opening in a side thereof, a track extending through the opening and into the interior of the chamber transversely thereof, a truck mounted on the track for movement into and out of the chamber, and a slab carried by the truck and onto, down and from which glass may flow from a source of supply when the slab is disposed within the chamber.

18. In an apparatus of the class described, means forming a tempering chamber having an open bottom and a gate controlled side opening, a track extending into the chamber through the side opening, a truck mounted on the track for movement into and out of the chamber, and means for directing the flow of a glass stream from a molten source of supply down into the chamber and through a portion thereof, said means having at its discharge end a slab member which is carried by the truck for movement therewith and from the discharge end of which the glass flows in sheet form.

19. In an apparatus of the class described, means forming a vertically disposed tempering chamber open at its bottom and having a gate controlled side opening, a truck mounted in the chamber and removable therefrom through its side opening, a slab carried by the truck within the chamber and for movement with the truck, and means for directing a stream of molten glass onto the upper end of the slab, the stream then dividing and flowing down opposite sides of the slab and from the lower discharge end thereof in single sheet form.

20. In an apparatus of the class described, means forming a tempering chamber and having a gate controlled opening in a side thereof, a track extending into the chamber through said opening, a truck mounted on the track for movement into and out of the chamber, and having end cross bars and side connecting bars, a slab carried in substantially vertical position by the truck with its lower portion suspended therefrom between its cross-bars, and means for directing molten glass in stream form onto the upper end of the slab, the glass flowing down the slab and from the same and the chamber in continuous sheet form.

21. In an apparatus of the class described, means forming a tempering chamber and having a gate controlled opening in a side thereof, a track extending into the chamber through said opening, a truck mounted on the track for movement into and out of the chamber, and having end cross-bars and side connecting bars, a slab carried in substantially vertical position by the truck with its lower portion suspended therefrom between its cross-bars, and means for directing molten glass in stream form onto the upper end of the slab, the glass flowing down the slab and from the same and the chamber in continuous sheet form, the parts of the truck having provision for the circulation of a cooling fluid therethrough.

22. In an apparatus of the class described, a vertically disposed directing member down and from which molten glass flows in continuous sheet form, with its outer face exposed to gases and means spaced from a side of the member below the point where the sheet becomes exposed to gases and adapted for coaction with the sheet to gauge the thickness of the glass stream throughout its width.

23. In an apparatus of the class described, a member down and from which molten glass flows in sheet form from a source of supply with its outer face exposed to gases, a gauging blade disposed at one side of the member in position to coact with the glass flowing down the same to regulate the thickness thereof at a point below where its outer face becomes exposed to gases, and means carrying the blade for varying adjustment with respect to the member.

24. In an apparatus of the class described, a member down and from which molten glass flows in sheet form from a source of supply with the face of the sheet exposed to gases, and means in predetermined spaced relation to a surface of the member down which the glass flows for interrupting the flow intermediate the ends of the member and below the point where the face of the sheet becomes exposed to gases to obviate lines and other difficulties occurring in the glass above such point, said means being mounted for varying adjustment with respect to the member.

25. In an apparatus of the class described, a slab down and from which glass flows in sheet form from a source of supply, a member disposed in spaced relation to the surface of the slab down which the glass flows for interrupting the free flow of the glass intermediate the ends of the slab and to gauge the thickness of the stream of glass flowing from the lower end of the slab, and means carrying the member for rocking movements about a central point and for radial movements relative to such point.

26. In an apparatus of the class described, a slab down and from which glass flows in sheet form from a source of supply, a flexible blade for coacting with the glass flowing down the slab to gauge the thickness thereof throughout its width of flow, and a plurality of relatively adjustable arms carrying the blade to impart predetermined adjustment thereto relative to the slab.

27. In an apparatus of the class described, means forming a tempering chamber and having an open bottom, a member within the chamber down and from which molten glass flows in sheet form, a source of supply providing a thin film at the top edge of the member, and means coacting with the film at a side of the member and within the chamber below its top to gauge the thickness of the glass sheet flowing from the lower end of the member.

28. In an apparatus of the class described, means forming a tempering chamber, means for directing the flow of a glass stream from a molten source of supply onto the upper end of the slab, the stream being divided by the slab and flowing down opposite sides thereof in thin film form with the outer surfaces of the films exposed to gases from the top of the slab downward and merging and flowing in single sheet form from the discharge end of the slab, and adjustable members disposed within the chamber at opposite sides of the slab below its top for coaction with the respective glass films flowing down the slab to regulate the thickness thereof.

29. In an apparatus of the class described, a wedge shaped slab down opposite sides of which molten glass is intended to flow in thin film form to produce a sheet having a width approximating that of the slab, the upper end of the slab having a longitudinally extending recess, and means for directing molten glass onto the upper end of the slab within its recess whereby the glass is caused to flow substantially equally from the recess over opposite edges of the slab.

30. In an apparatus of the class described, means directing the flow of molten glass from a source of supply and having a discharge outlet from which the glass flows downward in wide stream form, a slab disposed below said outlet in vertically spaced adjacent relation thereto, the horizontal cross-section of the slab being of elongated substantially rectangular form and the upper end of the slab being recessed longitudinally thereof in vertical register with the discharge opening whereby the glass flows into the recess and is deflected thereby over opposite side edges of the slab in thin films which flow down opposite sides of the slab and merge and flow in single sheet form from the lower end thereof.

31. In an apparatus of the class described, means for directing the flow of molten glass in a broad stream to a ware forming point, a gate dividing said directing means into successive tempering chamber and comprising a plurality of relatively adjustable slabs, means for adjusting the slabs to vary the gate opening, means dividing the chamber in advance of the gate into a plurality of transversely separated zones, and means for regulating the temperature in the separate zones, the quantity of flow of the glass through the separate zones being regulated by an adjustment of the gate slabs.

32. In an apparatus for forming continuous glassware, means for directing the flow of molten glass in a broad stream from a source of supply to a ware forming point, separate gates separated longitudinally of the flow of the glass for dividing the directing means into a plurality of successive tempering chambers, separate means for regulating the temperature in the different chambers, vertically adjustable means for dividing one of the chambers into a plurality of transversely spaced tempering zones extending lengthwise of the flow of the glass, and means for adjusting said separating means, the gate in advance of the transversely separated zones being composed of a plurality of relatively adjustable slabs to permit a regulation of the quantity of flow of glass through each zone.

33. Sheet glass forming apparatus comprising means over which a stream of glass flows to a sheet forming point, partitions forming a plurality of longitudinal tempering zones over the stream, and separate independently regulable means for controlling the heat in each zone.

34. In an apparatus of the class described, means forming a passageway for the flowing of a broad stream of glass to a ware forming point, means forming a plurality of tempering zones over the stream extending longitudinally and spaced transversely thereof, separate regulable heating means for each zone, and a depth regulating gate for the stream disposed at the entrance end to said zones and having separately adjustable sections to control the depth of the portions of the stream flowing through the respective zones.

35. In an apparatus for producing sheet glass, a receptacle having downwardly converging side portions, means for supplying molten glass to the interior of the receptacle, the receptacle having a spillway at the upper portion thereof wherefrom the molten glass overflows down the converging sides, and means below the receptacle for guiding and drawing away the glass formed from the overflow.

36. In glass drawing apparatus, a receptacle having downwardly converging side portions, means for supplying molten glass to the interior of the receptacle, the receptacle having a spillway at the upper portion thereof wherefrom the molten glass overflows down the converging sides, and means below the receptacle for guiding and drawing away the glass formed from the overflow.

37. In a glass drawing apparatus, the combination of a receptacle the outer wall of which has opposing tapered portions, means for supplying molten glass to the interior of the receptacle, the receptacle having a spillway at the upper portion thereof constructed and arranged to cause the molten glass to overflow from the receptacle in different directions to the outer wall of said receptacle and thence down said tapered portions, and means below the receptacle for guiding away the glass formed by the overflow.

38. Glass drawing apparatus comprising a member having downwardly converging side portions, said member being adapted to receive molten glass from a supply in its upper end to effect overflow of molten glass therefrom to and down said side portions, and means for drawing away the glass formed from the overflow.

39. Glass drawing apparatus comprising a member having downwardly converging side portions and a molten glass receiving recess in its upper end from which molten glass is adapted to overflow to and down said converging side portions, and means for drawing away the glass formed from the overflow.

40. In glass drawing apparatus, a member having downwardly converging side portions, means supplying the entire mass of molten glass to be drawn exclusively to the upper end of the member wherefrom said molten glass overflows down the converging sides, and means for drawing away the glass formed from the overflow.

41. In the art of drawing sheet glass, a slab, means to flow a stream of glass down both sides of the slab and to draw the streams from the slab in sheet form, and means to retard the movement of the streams during their flow down the sides of the slab.

42. In the art of drawing sheet glass, a slab substantially rectangular in horizontal cross-section, means to flow a stream of glass down both sides of the slab and to draw the same therefrom in sheet form, and means arranged transversely along both sides of the slab for retarding movement of the glass down the sides of the slab.

43. In the art of drawing sheet glass, the process consisting of flowing a stream of glass, retarding the flow to create a reservoir, and then drawing the sheet from this reservoir.

44. In the art of drawing sheet glass, the process consisting of downwardly flowing a plurality of streams of plastic glass, intercepting the flow of each stream to build up a reservoir of glass, then permitting a uniform stream to flow from each reservoir, and then merging the two streams from where they can be drawn from in united sheet form.

45. In an apparatus for producing glass, an overflow receptacle the outer wall of which has downwardly converging opposed portions, means for supplying molten glass to the interior of the receptacle, the receptacle having a spillway at the upper portion thereof, said receptacle being constructed and arranged whereby the molten glass is permitted to overflow equally in different directions from the receptacle down the converging portions in a free and uninterrupted manner, and means below the receptacle for guiding and drawing away the glass formed from the overflow.

46. In a glass drawing apparatus, a directing member having downwardly converging side portions, said member having a glass-receiving recess at a point disposed intermediate the side portions and adjacent the upper edges thereof, the recessed part forming a spillway, means for directing molten glass into the recess whereby the glass is caused to flow over the wall of the recess and down the outer side portions of said member, the said member being spaced laterally from any means which might contact with any portion of the glass from the time it leaves the receiving recess until it leaves the lower end of said member whereby the uninterrupted and unobstructed flow of the complete mass of glass along the side portions of the member is insured, and means spaced below the directing member for guiding away the glass therefrom.

47. The method of producing sheet glass, consisting in flowing a stream of molten glass downwardly from a container, catching the molten glass on the upper end of a directing member down the outer sides of which the glass flows in thin films, highly heating the glass as it flows from the container to the directing member, and drawing the thin films from the end of the directing member in united sheet form.

48. In sheet glass apparatus, a receptacle for molten glass having means to permit a flow of glass therefrom, a slab positioned in the path of the flow of glass to catch the same and to cause it to flow down both sides thereof in thin film formation, means for heating the stream as it passes from the container to the slab, and means to draw the thin films from the end of the slab in united sheet form.

In testimony whereof I have hereunto subscribed my name to this specification.

EDWARD DANNER.